(12) United States Patent
Mentz et al.

(10) Patent No.: US 7,310,588 B2
(45) Date of Patent: Dec. 18, 2007

(54) SYSTEM AND METHOD FOR VERIFYING THE DIMENSIONS OF AIRFOILS

(75) Inventors: Karl A. Mentz, East Hartford, CT (US); Bryan P. Dube, Columbia, CT (US); Richard M. Salzillo, Jr., Plantsville, CT (US)

(73) Assignee: United Technologies Corporation, Hartford, CT (US)

( * ) Notice: Subject to any disclaimer, the term of this patent is extended or adjusted under 35 U.S.C. 154(b) by 144 days.

(21) Appl. No.: 11/257,433

(22) Filed: Oct. 24, 2005

(65) Prior Publication Data

US 2007/0107180 A1   May 17, 2007

(51) Int. Cl.
*G01B 5/00*  (2006.01)
(52) U.S. Cl. ...................... 702/155; 702/168
(58) Field of Classification Search ................. 702/155
See application file for complete search history.

(56) References Cited

U.S. PATENT DOCUMENTS 5,047,966 A * 9/1991 Crow et al. .................. 702/168

2005/0182592 A1 * 8/2005 Aikens et al. .............. 702/155

* cited by examiner

*Primary Examiner*—John Barlow
*Assistant Examiner*—Jonathan Moffat
(74) *Attorney, Agent, or Firm*—Bachman & LaPointe, P.C.

(57) ABSTRACT

A computer-implemented method for verifying geometries of airfoils includes the steps of providing a part having an airfoil having an intended positional geometry and an intended feature geometry; measuring a first set of points of a primary datum system; determining an actual positional geometry of the airfoil based on the primary datum system measurements; calculating a first deviation between the intended positional geometry and the actual positional geometry of the airfoil; measuring a plurality of sets of points of at least one secondary datum system; determining an actual feature geometry of the airfoil based on the at least one secondary datum system measurement; calculating a second deviation between the intended feature geometry and the actual feature geometry of the airfoil; and performing a verification of the intended positional geometry and the intended feature geometry of the airfoil based upon the first deviation and the second deviation.

32 Claims, 3 Drawing Sheets

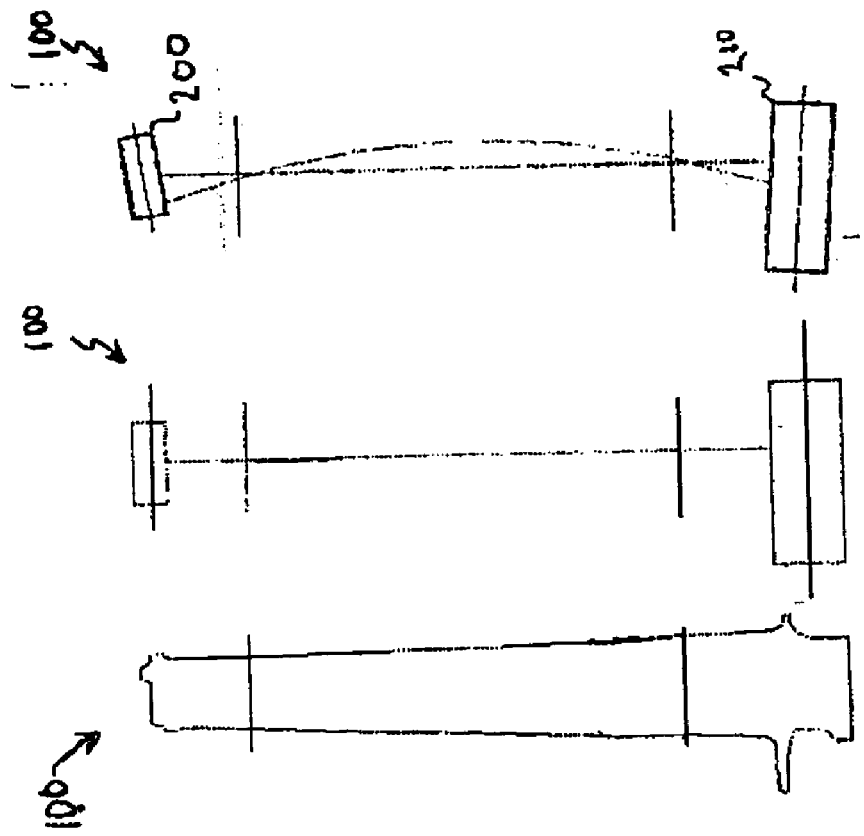
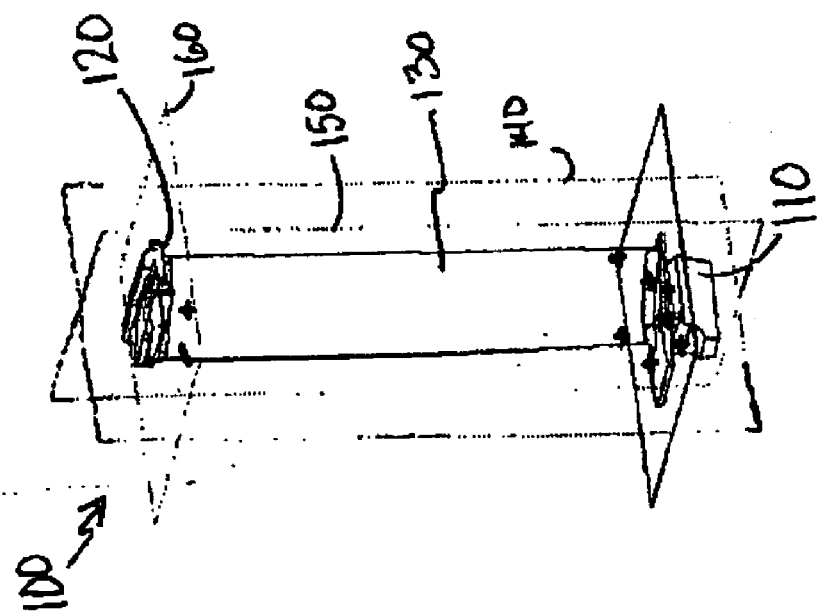

SYSTEM AND METHOD FOR VERIFYING THE DIMENSIONS OF AIRFOILS

U.S. GOVERNMENT RIGHTS

The Government of the United States of America may have rights in the present invention pursuant to Contract No. F33657-99-D-2051-0010 awarded by the United States Air Force.

FIELD OF USE

The present disclosure relates to measuring airfoil geometries and, more particularly, to measuring and verifying airfoil geometries.

BACKGROUND OF THE INVENTION

Verifying the geometries of airfoil castings is required to detect deviations introduced during the casting process. A hard tool creates a very dimensionally accurate wax pattern but remainder of the investment casting process introduces geometric variability into the part. This deviation is inherent in the process and, although it can be controlled, it cannot be completely removed. Although this deviation is present, to some extent, on all castings, parts having high aspect ratio airfoils are particularly susceptible due to the relatively long, slender nature of the airfoils, which become easily distorted. The two types of geometric variation that are commonly introduced are form and positional. Form tolerance refers to the geometry of a particular feature or group of features. Positional tolerance measures the geometric relation between feature(s), that is, the location of the feature(s) in relation to each other. Casting deviations are usually a combination of these two types of variation.

Referring to FIGS. 1-5, the current datum system used for a part 10 with an airfoil 12 is established with six nest points 14, 16, 18, 20, 22, 24, five on the airfoil (14, 16, 18, 20, 22) and one on a radial surface (24) of the platform or shroud; all located within the S-plane 26 (axial plane), T-plane 28 (circumferential or tangential plane) and U-plane 30 (radial plane) (See FIGS. 1 and 2). This datum system is used for measuring all surfaces of the part 10 with respect to the part's nominal geometry. The parts are then inspected and the deviations of the profile and form are determined. When deviations are quite small relative to the intended tolerance there are no issues with the current datum system. However, as deviations increase with respect to the intended tolerances (s), more information is necessary to determine whether the resultant part features are still acceptable.

With the airfoil nest, features at the tip or shroud 32 and root 34 of the part can have significant positional variation due to distortion of the airfoil during casting (See FIGS. 3-5). For instance, solidification induces stresses in the mold, which create distortion in the finished part. This is an unavoidable result of the investment casting process. The form of the features may still be dimensionally correct even if they are out of position. Under the current datum system, the form deviation of the shroud 32 or root 34 may be measured according to a desired virtual form 36 as known to one of ordinary skill in the art. As shown, the desired virtual form 36 may be formed about the shroud 32 or root 34 (FIG. 3) and then expanded to account for distortion (FIG. 4). However, when a tip, shroud or root feature is measured with respect to the airfoil nest in the current datum system, the form and position deviations are combined and the deviations at times appear to be significant (See FIG. 5).

It is not possible with the current datum system to distinguish a feature that has the correct form but is out of position from a feature that does not have the correct form. Without independent verification of both the form and position it is not possible to determine accurately the amount of distortion of the part. As positional deviation is often much larger than form deviation, combining the two results in an unacceptably large reported form tolerance during inspection. A part having an incorrect form can encompass any number of process induced form variations. Examples of process induced form variations include bulging of the shell due to shell weakness or shell creep, incorrect wax or metal shrink factor, and local shell strength conditions.

Consequently, there exists a need for a system and method that verifies the positional geometry of an airfoil independent of the feature geometry of the airfoil, root and shroud.

There also exists a need for a system and method that verifies the feature geometry of an airfoil independent of the positional geometry of the airfoil, root and shroud.

There further exists a need for a system and method that determines and accurately evaluates the positional deviations of an airfoil, root and shroud.

SUMMARY OF THE INVENTION

In accordance with the present disclosure, a computer-implemented method for verifying geometries of airfoils broadly comprises providing a part having an airfoil having an intended positional geometry and an intended feature geometry; measuring a first set of points of a primary datum system; determining an actual positional geometry of the airfoil based on the primary datum system measurements; calculating a first deviation between the intended positional geometry and the actual positional geometry of the airfoil; measuring a plurality of sets of points of at least one secondary datum system; determining an actual feature geometry of the airfoil based on the at least one secondary datum system measurement; calculating a second deviation between the intended feature geometry and the actual feature geometry of the airfoil; and performing a verification of the intended positional geometry and the intended feature geometry of the airfoil based upon the first deviation and the second deviation.

In accordance with the present disclosure, a system broadly comprising a computer readable storage medium having embodied therein means for verifying geometries of airfoils broadly comprises means for measuring a first set of points of a primary datum system corresponding to an actual positional geometry of an airfoil; means for determining the actual positional geometry based on the primary datum system measurements; means for calculating a first deviation between an intended positional geometry and the actual positional geometry of the airfoil; means for measuring a plurality of sets of points of at least one secondary datum system corresponding to an actual feature geometry of at least one feature of the airfoil; means for determining the intended feature geometry of the at least one feature of the airfoil based on the at least one secondary datum system measurement; means for calculating a second deviation between an intended feature geometry and the actual feature geometry of the airfoil; and means for performing a verification of the intended positional geometry and the intended feature geometry of the airfoil based upon the first deviation and the second deviation.

In accordance with the present disclosure, a method for verifying geometries of airfoils broadly comprises providing a part having an airfoil having an intended positional geometry and an intended feature geometry; measuring a first set of points of a primary datum system; determining an actual positional geometry of the airfoil based on the primary datum system measurements; calculating a first deviation between the intended positional geometry and the actual positional geometry of the airfoil; measuring a plurality of sets of points of at least one secondary datum system; determining an actual feature geometry of the airfoil based on the at least one secondary datum system measurement; calculating a second deviation between the intended feature geometry and the actual feature geometry of the airfoil; and performing a verification of the intended positional geometry and the intended feature geometry of the airfoil based upon the first deviation and the second deviation In accordance with the present disclosure, an apparatus for verifying geometries of airfoils broadly comprises a primary datum system of a primary six point nest for an airfoil; at least one secondary datum system of at least one secondary six point nest broadly comprising at least one positional measurement point that corresponds to at least one point of the primary datum system of a primary six point nest for an airfoil; and at least one feature measurement point that corresponds to at least one feature of the airfoil; means for measuring a first set of points of the primary datum system corresponding to an actual positional geometry of an airfoil; means for determining the actual positional geometry based on the primary datum system measurements; means for calculating a first deviation between an intended positional geometry and the actual positional geometry of the airfoil; means for measuring a plurality of sets of points of the at least one secondary datum system corresponding to an intended feature geometry of at least one feature of the airfoil; means for determining the actual feature geometry of the at least one feature of the airfoil based on the at least one secondary datum system measurement; means for calculating a second deviation between an intended feature geometry and the actual feature geometry of the airfoil; and means for performing a verification of the intended positional geometry and the intended feature geometry of the airfoil based upon the first deviation and the second deviation.

In accordance with the present disclosure, a secondary datum system for use in verifying the positional geometry and feature geometry of an airfoil broadly comprises at least one secondary six point nest broadly comprising at least one positional measurement point that corresponds to at least one point of a primary datum scheme of a primary six point nest for an airfoil; and at least one feature measurement point that corresponds to at least one feature of the airfoil.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6 is a representation of a part having an airfoil and illustrating the six shroud points and six root points of the present invention, all toleranced to the S, T, and U planes;

FIG. 7 is another representation of the airfoil of the turbine engine component of FIG. 6;

FIG. 8 is a representation of a secondary airfoil datum system for a profile tolerance zone of the root section and a tertiary airfoil datum system for a profile tolerance of the shroud section of the airfoil of FIG. 7.

Like reference numbers and designations in the various drawings indicate like elements.

DETAILED DESCRIPTION

Figures 1, 2, 3, 4, 5:
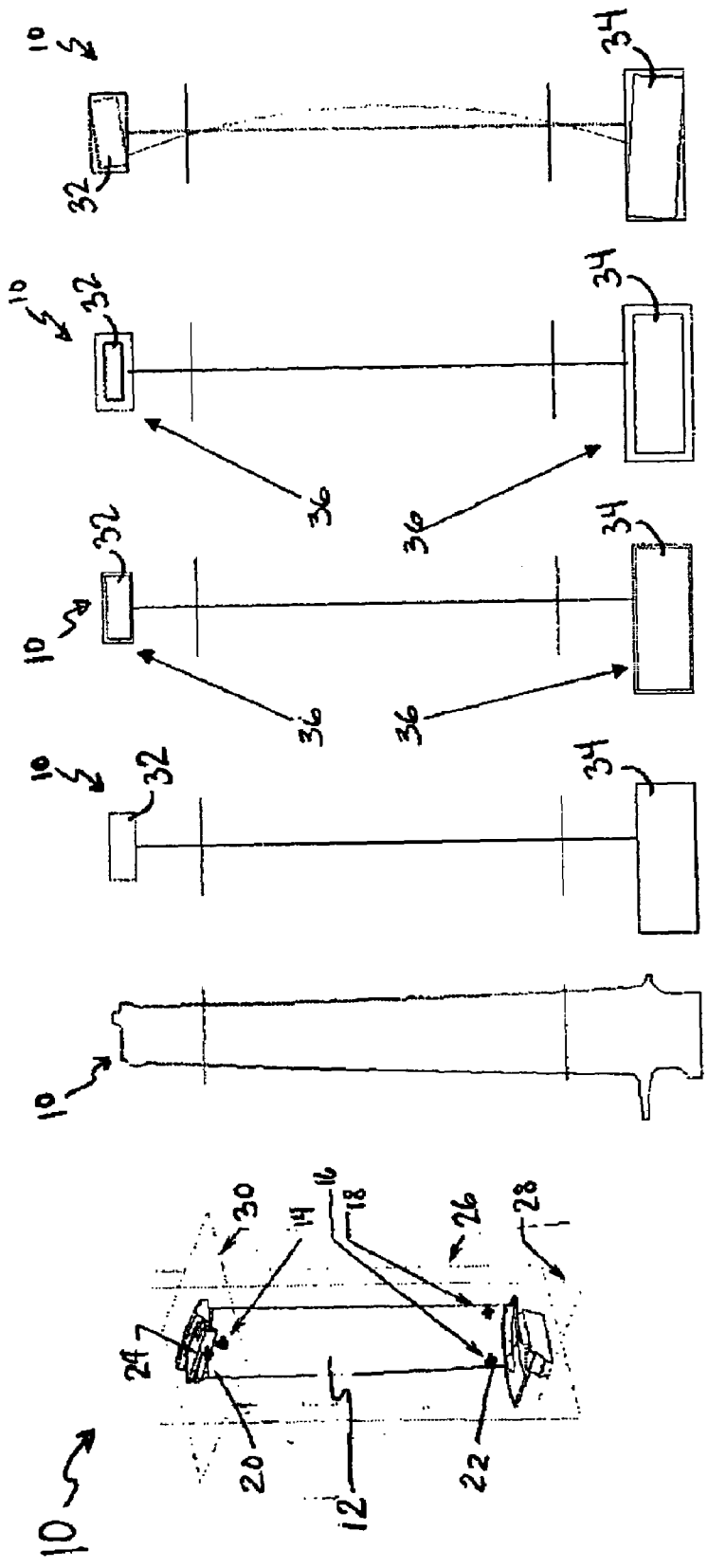
FIG. 1 is a representation of a part having an airfoil and illustrating the standard airfoil datum system of the prior art consisting of an S-plane (axial), T-plane (circumferential or tangential) and U-plane (radial) for a turbine engine component.
FIG. 2 is another representation of the airfoil of the part of FIG. 1 of the prior art.
FIG. 3 is a representation of the profile tolerance zones of the root and shroud sections of the part as illustrated in FIG. 2 of the prior art.
FIG. 4 is a representation of the combined profile and form tolerance zones of the root and shroud sections required for current casting processes depicted upon the part as illustrated in FIG. 2 of the prior art.
FIG. 5 is a representation of the profile distortion experienced by the airfoil at the root and shroud sections of the part as illustrated in FIG. 2 of the prior art.
Figure 9:
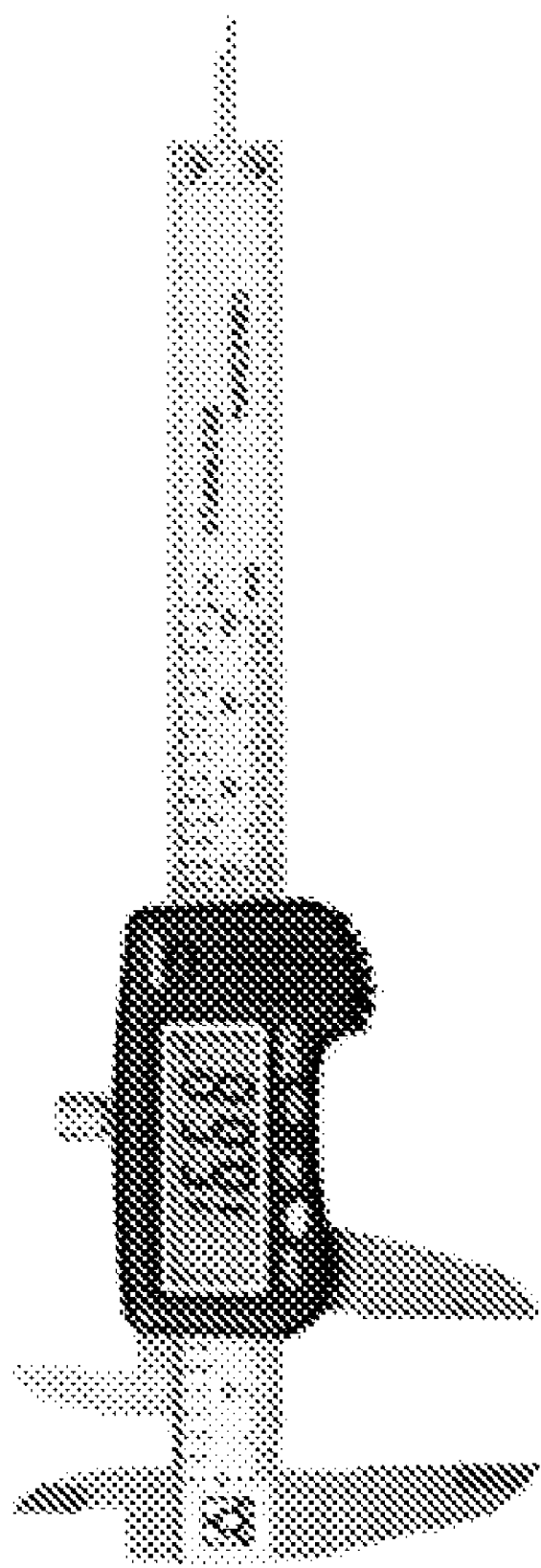
FIG. 9 is a representation of a hand layout tool for use herein.

The system(s) and method(s) of the present invention verify the positional geometry of an airfoil independent of the form or the feature geometry of the airfoil, and vice versa. Rather than employing only one primary datum system, that is, a six point nest, as does the prior art, the present invention utilizes one or more additional datum systems, that is, one or more additional six point nests, to verify the positional geometry independently from the feature geometry. The system(s) and method(s) of the present invention may be implemented using hard nests utilizing primary and secondary datum systems and by performing hand layouts to verify the positional geometry independent of the feature geometry.

In the alternative, the system(s) and method(s) for verifying the positional geometry of an airfoil independent of the form or feature geometry of the airfoil, and vice versa, described herein may also be computer-implemented systems and methods, that is, a soft nest or a computer generated model of the six point nests of the primary and one or more secondary datum systems and their subsystems, if any. The computer-implemented system(s) and method(s) may be embodied in a computer readable storage medium of a computer, e.g., server, desktop, laptop, personal digital assistant, and the like; a portable computer readable storage medium, e.g., a diskette, a compact disk, a digital video disc, a memory stick or card, and the like; or at least one server for an internet or intranet portal or system, and combinations comprising at least one of the foregoing systems. The computer-implemented method may also be embodied in the aforementioned storage mediums, portable storage mediums and intranet or intranet embodiments. When activating or initiating the computer-implemented method, the method and/or system transforms the machine into a quality control device that does not merely manipulate data but transforms data into a tangible, concrete result, that is, the deviations between the actual measurements of the airfoil and the measurements independently determined by the primary datum system and one or more secondary datum systems which verify the airfoil dimensions.

The airfoil itself is only a part of a gas turbine engine part or even a part of turbomachinery application outside of gas turbine engines. The gas turbine engine part or turbomachinery application generally include one or more features such as, but not limited to, a shroud portion, a root portion, a tip portion, and the like, and the airfoil. The method(s) and system(s) described herein may be employed when constructing any of the aforementioned turbine engine parts and are particularly effective when manufacturing parts having high aspect ratio airfoils. Such airfoils are relatively long and slender and become easily distorted. As mentioned beforehand, the investment casting process introduces geometric variability, that is, variations or distortions in the part. As a result, parts having high aspect ratio airfoils are very susceptible to experiencing distortion.

As recognized by one of ordinary skill in the art, the investment casting process inherently introduces such distortions. The present system(s) and method(s) introduce additional measures to identify these distortions and verify whether or not the resultant positional and feature geometries of the part's airfoil fall within acceptable profile tolerances.

By creating secondary datum systems that are related to the primary datum system, the form and position tolerances for the root and tip features can be separated and the airfoil dimensions may be independently and accurately verified. The primary datum system described herein refers to a top level system while the secondary datum systems refer to the features of the turbomachinery component, for example, root, tip, shroud, airfoil and the like. However, it is contemplated that subsystem datum systems may also be created and utilized to verify whether or not the resultant positional and feature geometries of certain features, for example, the leading edge of an airfoil, and the like, fall within acceptable profile tolerances. In this example, the primary datum system may pertain to the positional tolerance of the part within the S-plane, T-plane and U-plane while the secondary datum system may pertain to the form tolerance of the airfoil. In turn and in keeping with the teachings of the present invention, a subsystem datum system of the primary datum system may pertain to the positional tolerance of the part while the subsystem datum system of the secondary datum system may then pertain to the form tolerance of the leading edge of the airfoil.

In carrying out the system(s) and method(s) of the present invention, hard nests may be manufactured with system and subsystem datum systems in mind, that is, the various six point nests, using any one of a number of methods known to one of ordinary skill in the art. The hard nests are manufactured according to the intended specifications of the part and thus embody the part's intended form and positional tolerances and corresponding form and positional geometries. Hand layout tools such as dial indicators, calipers, surface plates, and the like, as known to one of ordinary skill in the art, may then be designed and/or utilized to measure the actual measurements, that is, the actual form and positional tolerances and corresponding form and positional geometries of the part. The differences between the intended form and positional tolerances and the actual form and positional tolerances may be quantified as deviations. These deviations then indicate whether or not the resultant positional and feature geometries of the part fall within acceptable profile tolerances.

Referring now to FIG. 6, a part 100 having a root section 110, a shroud section 120 and an airfoil 130 disposed is shown along with an S-plane 140, a T-plane 150 and a U-plane 160. One or more independent secondary datum systems are established on the features, that is, tip or shroud and root, using six datum points; these additional independent datum sets are entirely separate datum systems from the primary airfoil datum system. These secondary datum systems on the feature(s) are used to measure the form of the feature(s) relative to the datums created using points on the feature. These secondary datum systems allow verification of the feature geometry but do not provide any positional information. These sets of six points used to create the secondary datum systems are then related to the primary airfoil datum system and used to report the position of the feature(s) relative to the primary datums. This new information constitutes the position of the part 100 without respect to the features form. With the introduction of the second datum systems, the two types of deviation can be evaluated independently.

Referring now to FIGS. 7-8, one or more secondary datum systems may be utilized to determine the variations and distortions of the feature geometry. FIG. 7 depicts a first profile 210 of a secondary datum system for the root section and a second profile 200 of a tertiary datum system for the shroud section. The secondary and tertiary datum systems may each comprise six point nests; the location of the points along the part features may be determined according to the measurement of the form and positional tolerances as known to one of ordinary skill in the art. These secondary and tertiary datum systems operate independently with respect to the primary datum system. After casting the turbine engine component, the resultant product will exhibit some amount of distortion as illustrated in FIG. 8. The profiles 200, 210 of the secondary and tertiary datum systems may now follow the movement of the root section 110 and shroud section 120. Although the profiles 200, 210 exhibit tighter control over the form of each section, the profiles 200, 210 more accurately follow each sections 110, 120 respective movement. In addition, it is also contemplated that additional datum points may be incorporated within the profiles 200, 210 in order to determine further the resultant position of each section after casting.

Independent verification of position enables the evaluation of distortion of a part due to solidification, shell/mold setup, thermal treatments and other related process induced form variations. The investment casting process may then be altered accordingly, for instance, by introducing a wax reforming technique known to one of ordinary skill in the art. Wax reforming techniques can introduce an amount of deviation, based upon the accurate position geometry obtained from the present system and method, into the wax pattern in order to counter process induced distortion. The counteracting distortions are intended to combine with the process induced distortions to produce a part that is closer to nominal.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A computer-implemented method for verifying geometries of airfoils, comprising:

providing a part having an airfoil having an intended positional geometry and an intended feature geometry;

measuring a first set of points of a primary datum system;

determining an actual positional geometry of said airfoil based on said primary datum system measurements;

calculating a first deviation between said intended positional geometry and said actual positional geometry of said airfoil;

measuring a plurality of sets of points of at least one secondary datum system;

determining an actual feature geometry of said airfoil based on said at least one secondary datum system measurements;

calculating a second deviation between said intended feature geometry and said actual feature geometry of said airfoil; and performing a verification of said intended positional geometry and said intended feature geometry of said airfoil based upon said first deviation and said second deviation.

2. The method of claim 1, wherein measuring said plurality of sets of points further comprises measuring a second set of points of a secondary datum system for a root section of said airfoil.

3. The method of claim 2, wherein said second set of points correspond to a plurality of locations on said root section.

4. The method of claim 1, wherein measuring said plurality of sets of points further comprises measuring a second set of points of a second datum system for a shroud section of said airfoil.

5. The method of claim 4, wherein said second set of points correspond to a plurality of locations on said shroud section.

6. The method of claim 1, wherein measuring said plurality of sets of points further comprises:

generating a profile about at least one feature of said airfoil;

adjusting the position of said profile about said at least one feature to accommodate an actual displacement of said feature; and measuring a second set of points of a secondary datum system within said profile of said at least one feature.

7. The method of claim 6, wherein generating said profile comprises generating said profile about a shroud portion, a root portion or a tip portion of said airfoil.

8. The method of claim 6, wherein generating said profile comprises generating said profile about a shroud portion, a root portion and a tip portion of said airfoil.

9. The method of claim 1, wherein performing said verification comprises determining whether said first deviation and said second deviation fall within acceptable profile tolerance parameters for said airfoil.

10. A system comprising a computer readable storage medium having embodied therein means for verifying geometries of airfoils, comprising:

means for measuring a first set of points of a primary datum system corresponding to an actual positional geometry of an airfoil;

means for determining said actual positional geometry based on said primary datum system measurements;

means for calculating a first deviation between an intended positional geometry and said actual positional geometry of said airfoil;

means for measuring a plurality of sets of points of at least one secondary datum system corresponding to an actual feature geometry of at least one feature of said airfoil;

means for determining said actual feature geometry of said at least one feature of said airfoil based on said at least one secondary datum system measurement;

means for calculating a second deviation between an intended feature geometry and said actual feature geometry of said airfoil; and means for performing a verification of said intended positional geometry and said intended feature geometry of said airfoil based upon said first deviation and said second deviation.

11. The system of claim 10, wherein said means for measuring said plurality of sets of points further comprises:

means for generating a profile about one feature of said at least one feature of said airfoil;

means for adjusting the position of said profile about said at least one feature to accommodate an actual displacement of said at least one feature; and means for measuring a second set of points of a secondary datum system within said profile of said feature.

12. The system of claim 10, wherein said computer readable storage medium is portable.

13. The system of claim 10, wherein said at least one feature of said airfoil is a shroud portion, a root portion or a tip portion.

14. A method for verifying geometries of airfoils, comprising:

providing a part having an airfoil having an intended positional geometry and an intended feature geometry;

measuring a first set of points of a primary datum system;

determining an actual positional geometry of said airfoil based on said primary datum system measurements;

calculating a first deviation between said intended positional geometry and said actual positional geometry of said airfoil;

measuring a plurality of sets of points of at least one secondary datum system;

determining an actual feature geometry of said airfoil based on said at least one secondary datum system measurement;

calculating a second deviation between said intended feature geometry and said actual feature geometry of said airfoil; and performing a verification of said intended positional geometry and said intended feature geometry of said airfoil based upon said first deviation and said second deviation.

15. The method of claim 14, wherein measuring said plurality of sets of points further comprises measuring a second set of points of a secondary datum system for a root section of said airfoil.

16. The method of claim 15, wherein said second set of points corresponds to a plurality of locations on said root section.

17. The method of claim 14, wherein measuring said plurality of sets of points further comprises measuring a second set of points of a second datum system for a shroud section of said airfoil.

18. The method of claim 17, wherein said second set of points correspond to a plurality of locations on said shroud section.

19. The method of claim 14, wherein measuring said plurality of sets of points further comprises:

generating a profile about at least one feature of said airfoil;

adjusting the position of said profile about said at least one feature to accommodate an actual displacement of said at least one feature; and measuring a second set of points of a secondary datum system within said profile of said at least one feature.

20. The method of claim 19, wherein generating said profile comprises generating said profile about a shroud portion of said airfoil.

21. The method of claim 19, wherein generating said profile comprises generating said profile about a root portion of said airfoil.

22. The method of claim 19, wherein generating said profile comprises generating said profile about a tip portion of said airfoil.

23. The method of claim 14, wherein performing said verification comprises determining whether said first deviation and said second deviation fall within acceptable profile tolerance parameters for said airfoil.

24. An apparatus for verifying geometries of airfoils, comprising:
a primary datum system of a primary six point nest for an airfoil;
at least one secondary datum system of at least one secondary six point nest comprising:
at least one positional measurement point that corresponds to at least one point of said primary datum system of a primary six point nest for an airfoil; and
at least one feature measurement point that corresponds to at least one feature of said airfoil;
means for measuring a first set of points of said primary datum system corresponding to an actual positional geometry of an airfoil;
means for determining said actual positional geometry based on said primary datum system measurements;
means for calculating a first deviation between an intended positional geometry and said actual positional geometry of said airfoil;
means for measuring a plurality of sets of points of said at least one secondary datum system corresponding to an intended feature geometry of at least one feature of said airfoil;
means for determining said actual feature geometry of said at least one feature of said airfoil based on said at least one secondary datum system measurement;
means for calculating a second deviation between an intended feature geometry and said actual feature geometry of said airfoil; and
means for performing a verification of said intended positional geometry and said intended feature geometry of said airfoil based upon said first deviation and said second deviation.

25. The apparatus of claim 24, wherein said at least one feature of said airfoil is a shroud portion, a root portion or a tip portion.

26. The apparatus of claim 24, wherein means for measuring comprises at least one hand layout tool.

27. An apparatus comprising:
at least one secondary datum system including at least one secondary six point nest for an airfoil comprising:
at least one positional measurement point that corresponds to at least one point of a primary datum scheme of a primary six point nest of said airfoil;
at least one feature measurement point that corresponds to at least one feature of said airfoil; and
means for performing a verification of a positional geometry of said primary datum scheme and a feature geometry of said secondary datum system of said airfoil.

28. The apparatus of claim 27, wherein said airfoil is a part of a turbine engine component.

29. The apparatus of claim 27, wherein said at least one positional measurement point relates to a positional geometry of at least one feature of said airfoil.

30. The apparatus of claim 27, wherein said at least one feature measurement point relates to a form geometry of at least one feature of said airfoil.

31. The apparatus of claim 27, wherein said primary six point nest comprises a hard nest.

32. The apparatus of claim 27, wherein said at least one secondary six point nest comprises at least one secondary hard nest.

* * * * *